3,220,996
REMOVAL OF METAL CONTAMINANTS FROM POLYMERIC MATERIALS
David C. Hull and Hugh J. Hagemeyer, Jr., Longview, Tex., assignors to Eastman Kodak Company, Rochester, N.Y., a corporation of New Jersey
No Drawing. Filed Nov. 21, 1961, Ser. No. 154,069
5 Claims. (Cl. 260—93.7)

This invention relates to the removal of metal contaminants from polymeric materials. In a specific aspect, this invention relates to a process for the removal of metal contaminants from polymeric materials, said contaminants resulting from catalyst residues used in the polymerization process. In a more specific aspect this invention relates to a process for removing metal contaminants from polymeric materials wherein monomers are polymerized in the presence of a catalyst obtained by reacting a reducing metal compound with a reducible metal compound.

In recent years, a new family of catalysts has been developed for the preparation of polymeric materials wherein vinyl monomers such as olefins, diolefins, and the like are polymerized in the presence of a catalyst obtained by reacting a reducing metal compound with a reducible metal compound. This type of catalyst has come to be known rather commonly as an anionic polymerization catalyst. One of the more serious problems encountered in the use of these anionic polymerization catalysts is the presence of a relatively high concentration of metal contaminants from the catalyst in the final polymeric product. Conventional polymer purification techniques have been generally unsuccessful in reducing the concentration of metal contaminants or ash below the levels necessary for good color and good electrical properties. The presence of the metal contaminants undesirably affects the color and the electrical properties of the polymer. When slurry procedures are employed for polymerizing the monomer the difficulty of removing metal contaminants from the polymer is particularly great and in the past efforts have been made to extract catalyst residues from the polymer by washing the polymer with a $C_1$ to $C_8$ alcohol. In solution polymerization procedures, the polymer usually contains substantially less contaminating metals since it is possible to remove catalyst residues from the polymer by filtration or other rather conventional means, but occasionally a filter break or other unusual conditions will result in the presence of an undesirable amount of catalyst residues in the final polymer.

Prior to our invention, it was known that catalyst residues could be extracted from polymers produced by anionic polymerization procedures, by washing the contaminated polymer with an alcohol containing a chelating agent. Among the chelating agents that have been used for this purpose are 1,3-dicarbonyl compounds, and these chelating agents have been incorporated in concentrations of about 1 to 5% by weight in the alcohol wash solution. With the alcohol wash solution containing the chelating agent, it has been possible to remove substantially all of the metal contaminants from the polymer. However, it has been observed that the metal chelates that are formed by reaction of the contaminating metals and the chelating agents are actually catalysts for the decomposition of the 1,3-dicarbonyl compounds used as chelating agents and as a result of this decomposition these chelating agents are usually used on a once-through basis, and they cannot be recovered and recycled. Consequently, it has been necessary to use relatively large amounts of the 1,3-dicarbonyl chelating agents, and these compounds are relatively expensive. Thus, in the past, the use of these chelating agents for the extraction of metal contaminants from the polymer has not been economically attractive.

It is an object of this invention to provide a novel process for the removal of metal contaminants from polymeric materials. It is another object of this invention to provide a novel process for removing catalyst residues from polymeric materials wherein decomposition of chelating agents in extraction liquids is inhibited. It is a further object of this invention to provide a novel alcoholic wash liquid for the extraction of metal contaminants from polymeric materials. Further and additional objects of our invention will be apparent from the detailed disclosure that follows.

We have found that the above objects can be accomplished by incorporating in the alcoholic wash liquid containing a 1,3-dicarbonyl chelating agent from 1 to 5% by volume of water. The presence of the water in the alcoholic wash liquid inhibits and, in fact, substantially completely eliminates decomposition of the chelating agent. Consequently, it is possible as a result of our invention to use the chelating agents in a continuous process and to recover and recycle the chelating agent. Since decomposition of the chelating agent is eliminated, it is also possible to realize substantial financial savings as a result of our discovery.

The polymeric materials that are employed in the practice of our invention are solid polymers prepared from vinyl monomers such as olefins, diolefins, and the like. The monomers that can be employed for the formation of the solid polymers are well known and have been described adequately in the prior art. Preferably, the invention is practiced on solid polymers prepared from α-monoolefinic hydrocarbons, such as ethylene, propylene, butene-1, hexene-1, heptene-1, dodecene-1 and the like, with ethylene and propylene being preferred. Also copolymers, such as block copolymers and graft copolymers perpared from the above olefins can also be used to form the solid polymers upon which our invention is practiced. The solid polymers can also be formed from diolefins, such as butadiene, isoprene, vinyl cyclohexene, cyclopentadiene, 1,4-pentadiene and the like. The various monomers and comonomers that can be used in the practice of our invention have been described in complete detail in the prior art, and our invention can be practiced upon solid polymers prepared from any of those monomers and comonomers.

The catalysts that are employed in the formation of these solid polymers are known as anionic polymerization catalysts. The catalysts are formed from reducible metal compounds reacting with a reducing metal compound. The reducing compound can be an aluminum hydride or organoaluminum compound such as aluminum trialkyls, alkyl aluminum sesquihalides, dialkyl aluminum monohalides and alkyl aluminum dihalides. Specific examples of such aluminum compounds include aluminum triethyl, aluminum trimethyl, aluminum triisopropyl, diethyl aluminum bromide, ethyl aluminum sesquichloride, diethyl aluminum monochloride, ethyl aluminum dichloride, aluminum hydride, lithium aluminum hydride, sodium aluminum hydride, and the like. Similarly, reducing metals, such as lithium, sodium and potassium as well as alkyl derivatives of these metals, for example, lithium butyl, sodium amyl, potassium propyl, and the like, can be used to effect the desired reduction. Other reducing compounds that can be used in these catalysts are lithium hydride, lithium aluminum tetraalkyls, such as lithium aluminum tetraethyl, lithium aluminum tetrabutyl, lithium aluminum tetrahexyl, and the like.

The reducible metal compounds that are employed in the catalysts are compounds of transition metals selected from the fourth to the sixth groups of the Periodic Table. The preferred transition metals are titanium, vanadium, zirconium, chromium and molybdenum, and it is also preferred to employ the halides of these transition metals at their maximum valence or at a reduced valence. Examples of the compounds of these metals that can be used include halides, such as chlorides and bromides, oxyhalides, such as oxychlorides as well as the alcoholates, acetates, benzoates or acetylacetonates. The most commonly used transition metal compounds are titanium tetrachloride, titanium trichloride, vanadium tetrachloride and vanadium trichloride but halides of the other transition metals can also be used.

The polymerization reaction and the conditions under which it is carried out have also been described in complete detail in the prior art. Generally, an inert liquid diluent, such as a normally liquid hydrocarbon, is employed in the process to facilitate the polymerization reaction, but if it is desired, the reaction can be carried out in the absence of a diluent. When no diluent is used, it is often desirable to employ the monomer to be polymerized in a liquid form. The proportion of catalyst used based on the inert liquid diluent is usually within the range of 0.05 to 0.5 weight percent and the polymerization reaction is conducted to the point where the final reaction mixture contains from 20 to 30% by weight of the polymer. The polymerization reaction is carried out at temperatures within the range of about −20° C. to 300° C. and higher, and the pressure is at least sufficient to maintain the reaction diluent in liquid form. Usually, the polymerization pressure varied from about one atmosphere to 250 atmospheres, but higher pressures can be used whenever it is deemed necessary.

The solid polymer that is prepared in accordance with this process is recovered from the polymerization reaction mixture after the reaction has proceeded to the desired level. Suitable methods of recovering the solid polymer from the reaction mixture include filtration, centrifuging, distillation and the like. The polymer that is thus produced normally contains catalyst residues or ash which can be regarded as contaminants in the polymer and for many uses of the polymer these contaminants affect the physical properties of the polymer adversely. These contaminants have been removed from the polymer by washing with a wash liquid containing a 1,3-dicarbonyl chelating agent, but as discussed above, this chelating agent in prior art procedures has been subject to substantial decomposition.

The solid polymer is washed in accordance with our invention with a solvent, such as an alcohol, acetone, esters, ethers, cellosolve, aqueous acids and alkali. The solvents that can be used for washing the solid polymer to remove metal contaminants are well known in the art. In accordance with our invention, the solid polymer, after separation from the polymerization reaction mixture, is washed with an aqueous liquid wash solution containing a chelating agent. Generally, the major portion of the washing liquid will be made up of the solvent, and we prefer to use as a solvent an aliphatic alcohol wherein the alkyl radical contains 1 to 8 carbon atoms. Aliphatic alcohols that can be used as solvents in our wash liquids include methyl alcohol, ethyl alcohol, isopropyl alcohol, isobutyl alcohol, n-butyl alcohol, n-hexyl alcohol and n-octyl alcohol and the like. If desired, any of the other known solvents that are effective for washing these solid polymers can also be used.

The above solvents or washing agents are combined in accordance with this invention with a comparatively small amount of a chelating agent. Among the preferred chleating agents that are useful are the 1,3-dicarbonyl compounds, such as diketones, keto esters and 1,3-diketo alcohols. Preferred chelating agents are acetylacetone and ethyl acetoacetate since these chelating agents show the highest efficiency for the removal of metal contaminants from the solid polymers. In general, the chelating agents that can be employed in the washing liquid are 1,3-dicarbonyl compounds having the formula:

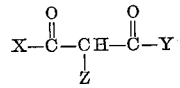

wherein X, Y and Z are similar or different groups selected from the following: hydrogen, hydroxy, alkoxy containing 1 to 6 carbon atoms, alkyl containing 1 to 6 carbon atoms and phenyl or substituted phenyl radicals. We have found it most desirable to employ the chelating agent in an amount such that it has a concentration from 0.5 to 10%, preferably from 0.5 to 5% of the wash solution.

Thus, in accordance with our invention, we employ a wash solution which is preferably an aliphatic alcohol solution containing from 0.5 to 10% by weight of a 1,3-dicarbonyl chelating agent. The prior art has disclosed such wash solutions for removing metal contaminants from the solid polymer. However, in the prior art, it was generally recognized that these wash solutions should be non-aqueous since the presence of water in such solutions was said to inhibit the washing efficiency of the aliphatic alcohol or other wash liquid even at concentrations of only 10 to 100 p.p.m. We have surprisingly found that water can be added to these wash solutions in certain concentrations and that when the water-containing wash solutions of our invention are employed to wash the solid polymer decomposition of the chelating agent can be substantially inhibited or completely eliminated and a washed solid polymer of improved color can be produced. For the practice of our invention we incorporate in the washing liquid containing the chelating agent from 1 to 5 volume percent water. The resulting wash liquid containing the solvent, chelating agent and water is then used to wash the solid polymer in a continuous or batch-wise manner. The washing of the solid polymer is carried out at a temperature varying from room temperature to a temperature just slightly below the softening point of the particular solid polymer being washed. By way of example, our invention can be used for the washing of solid pellets of polypropylene to remove metal contaminants or catalyst residue using isobutyl alcohol containing 2% by weight acetylacetone and 2 weight percent water. The solid polypropylene is washed with this liquid at the reflux temperature of the washing solution. In general, we prefer to use elevated temperatures below the softening point of the polymer in the washing operation and atmospheric or elevated pressures can be used to maintain the wash solution in liquid fashion at the washing temperature.

The following examples are illustrative of this invention.

EXAMPLE 1

Polypropylene having an inherent viscosity of 1.78 (determined at 145° C. in tetralin using a 0.25 weight percent polymer solution) was prepared by polymerization at 150° C. and 800 p.s.i.g. using a catalyst comprised of lithium aluminum hydride, titanium trichloride and magnesium oxide, (1:1:1). The polymer was filtered, concentrated, extruded into ribbons and chopped to pellets. The polypropylene pellets thus produced had an ash content of 0.04 percent and a color of 4. Extraction of the pellets with isobutanol containing 2 percent acetylacetone and varying amounts of water produced a polymer with an ash content of less than .001 percent and a color of 1 minus. In Table I, the effect of varying amounts of water on the decomposition of acetylacetone during the extraction of aliquots of this polymer is reported.

*Table I.—Effect of varying amounts of water on decomposition of acetylacetone in isobutanol solution*

| Original Weight Percent Acetylacetone | Water Volume Percent | Reflux Temp., °C. | Extraction Time, Hours | Final Weight percent Acetylacetone | Percent Loss |
|---|---|---|---|---|---|
| 2.0 | 0 | 107 | 18 | 1.02 | 49.0 |
| 2.0 | 0.4 | 105 | 18 | 1.73 | 21.8 |
| 2.0 | 1.0 | 104 | 18 | 1.87 | 6.3 |
| 2.0 | 2.0 | 98 | 18 | 2.0 | 0.0 |
| 2.0 | 5.0 | 94 | 18 | 2.0 | 0.0 |

EXAMPLE 2

A continuous extractor was operated at 100° C. feeding polypropylene pellets countercurrent to a stream of isobutanol containing 1.77 percent acetylacetone and 2 percent water. The pellets contained 14 percent residual mineral spirits and 0.06 percent ash comprised of aluminum and titanium halides. Approximately 4 pounds of wash solution per pound of pellets was used to effect substantial complete removal of mineral spirits and ash to give a colorless product.

In the absence of water the acetylacetone was decomposed and in the absence of make up acetylacetone the removal of ash was incomplete.

Table II gives the comparative data.

*Table II*

| Original Weight Percent Acetylacetone | Percent H₂O | Final Weight Percent Acetylacetone | Percent Loss | Final Percent Ash | Product Color |
|---|---|---|---|---|---|
| 1.77 | 0.0 | 0.79 | 55.5 | 0.01 | 2 |
| 1.77 | 2.0 | 1.77 | 0.0 | <0.001 | 1— |

The process of this invention has been used successfully to produce ash free polyethylene, cis-1,4-polybutadiene, propylene, ethylene and propylene-butene block polymers and polybutene-1.

Although the invention has been described in considerable detail with reference to certain preferred embodiments thereof, it will be understood that variations and modifications can be effected within the spirit and scope of the invention as described hereinabeve and as defined in the appended claims.

We claim:
1. In the preparation of a solid polymer wherein a vinyl monomer is polymerized in the presence of an anionic catalyst comprising a compound of the transition elements of the fourth to the sixth groups of the periodic table in combination with a reducing metal compound therefor, and wherein the resulting polymer contains catalyst residue, the improvement which comprises washing the solid polymer with a liquid alcohol wash solution containing a 1,3-dicarbonyl chelating agent and from 1 to 5 percent by volume based on the solution of water to remove catalyst residue therefrom.

2. In the preparation of a solid polymer wherein an α-monoolefinic hydrocarbon is polymerized in the presence of an anionic catalyst comprising a compound of the transition elements of the fourth to the sixth groups of the periodic table in combination with a reducing metal compound therefor, and wherein the resulting polymer contains catalyst residue, the improvement which comprises washing the solid polymer with a liquid alcohol wash solution containing a 1,3-dicarbonyl chelating agent and from 1 to 5% by volume based on the solution of water to remove catalyst residue therefrom.

3. In the preparation of a solid polymer wherein propylene is polymerized in the presence of an anionic catalyst comprising a compound of the transition elements of the fourth to the sixth groups of the periodic table in combination with a reducinig metal compound therefor, and wherein the resulting polymer contains catalyst residue, the improvement which comprises washing the solid polymer with a liquid alcohol wash solution containing a 1,3-dicarbonyl chelating agent and from 1 to 5% by volume based on the solution of water to remove catalyst residue therefrom.

4. In the preparation of a solid polymer wherein propylene is polymerized in the presence of a lithium aluminum hydride, titanium trichloride catalyst and the resulting polymer contains catalyst residue, the improvement which comprises washing the solid polymer with a liquid aliphatic alcohol solution containing a 1,3-dicarbonyl chelating agent and from 1 to 5 percent by volume based on the solution of water to remove catalyst residue therefrom.

5. The process according to claim 4 wherein the chelating agent is acetylacetone.

References Cited by the Examiner
UNITED STATES PATENTS
2,928,817  3/1960  Neal et al. _____ 260—94.9

FOREIGN PATENTS
844,832  8/1960  Great Britain.

JOSEPH L. SCHOFER, *Primary Examiner.*
M. LIEBERMAN, *Examiner.*